US007149534B2

(12) United States Patent
Bloebaum et al.

(10) Patent No.: US 7,149,534 B2
(45) Date of Patent: Dec. 12, 2006

(54) PEER TO PEER INFORMATION EXCHANGE FOR MOBILE COMMUNICATIONS DEVICES

(75) Inventors: L. Scott Bloebaum, Cary, NC (US); Havish Koorapaty, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 801 days.

(21) Appl. No.: 09/767,461

(22) Filed: Jan. 23, 2001

(65) Prior Publication Data

US 2002/0098849 A1    Jul. 25, 2002

(51) Int. Cl.
*H04Q 7/20* (2006.01)
*H04M 11/04* (2006.01)

(52) U.S. Cl. ............................. 455/456.6; 455/404.2; 342/357.09

(58) Field of Classification Search .. 455/456.1–456.6, 455/457, 518, 519, 11.1, 41.2, 404.1–404.2; 342/357.1, 357.15, 357.01–357.11; 709/225, 709/226, 229; 713/200; 701/213–215, 226
See application file for complete search history.

(56) References Cited

U.S. PATENT DOCUMENTS

| | | | | |
|---|---|---|---|---|
| 5,355,511 A | * | 10/1994 | Hatano et al. | 455/11.1 |
| 5,473,605 A | * | 12/1995 | Grube et al. | 370/261 |
| 5,689,269 A | * | 11/1997 | Norris | 342/357.08 |
| 5,781,150 A | * | 7/1998 | Norris | 342/357.08 |
| 5,952,959 A | * | 9/1999 | Norris | 342/357.08 |
| 6,032,051 A | * | 2/2000 | Hall et al. | 455/518 |
| 6,058,338 A | * | 5/2000 | Agashe et al. | 701/13 |
| 6,070,078 A | | 5/2000 | Camp, Jr. et al. | |
| 6,097,949 A | | 8/2000 | Jung et al. | |
| 6,111,540 A | * | 8/2000 | Krasner | 342/357.1 |
| 6,240,069 B1 | * | 5/2001 | Alperovich et al. | 370/260 |
| 6,266,533 B1 | * | 7/2001 | Zadeh et al. | 455/456.2 |
| 6,301,609 B1 | * | 10/2001 | Aravamudan et al. | 709/207 |
| 6,323,803 B1 | * | 11/2001 | Jolley et al. | 342/357.03 |
| 6,373,430 B1 | * | 4/2002 | Beason et al. | 342/357.09 |
| 6,377,793 B1 | * | 4/2002 | Jenkins | 455/412.1 |
| 6,389,291 B1 | * | 5/2002 | Pande et al. | 455/456.5 |
| 6,397,074 B1 | * | 5/2002 | Pihl et al. | 455/456.2 |
| 6,411,811 B1 | * | 6/2002 | Kingdon et al. | 455/456.5 |
| 6,449,486 B1 | * | 9/2002 | Rao | 455/456.1 |
| 6,449,558 B1 | * | 9/2002 | Small | 701/213 |
| 6,477,353 B1 | * | 11/2002 | Honda et al. | 455/11.1 |
| 6,542,749 B1 | * | 4/2003 | Tanaka et al. | 455/456.1 |
| 6,542,750 B1 | * | 4/2003 | Hendrey et al. | 455/456.1 |
| 6,553,236 B1 | * | 4/2003 | Dunko et al. | 455/457 |
| 6,625,458 B1 | * | 9/2003 | Pihl et al. | 455/456.1 |

(Continued)

FOREIGN PATENT DOCUMENTS

EP        0748085        12/1996

(Continued)

OTHER PUBLICATIONS

Patent Abstracts of Japan vol. 1998, No. 02, Jan. 30, 1998 & JP 09 284275 A (Nippon Telegr & Teleph Corp), Oct. 31, 1997 abstract.

(Continued)

*Primary Examiner*—Charles N. Appiah
(74) *Attorney, Agent, or Firm*—Coats & Bennett, P.L.L.C.

(57) ABSTRACT

The invention discloses various methods whereby mobile communications devices, connected to a communications network can share data by acting as both clients and servers. Specifically contemplated is the sharing of GPS assistance data. Also disclosed is the formation and use of hierarchical groups of mobile communications devices for the purpose of information sharing.

44 Claims, 1 Drawing Sheet

U.S. PATENT DOCUMENTS

Figure 1:
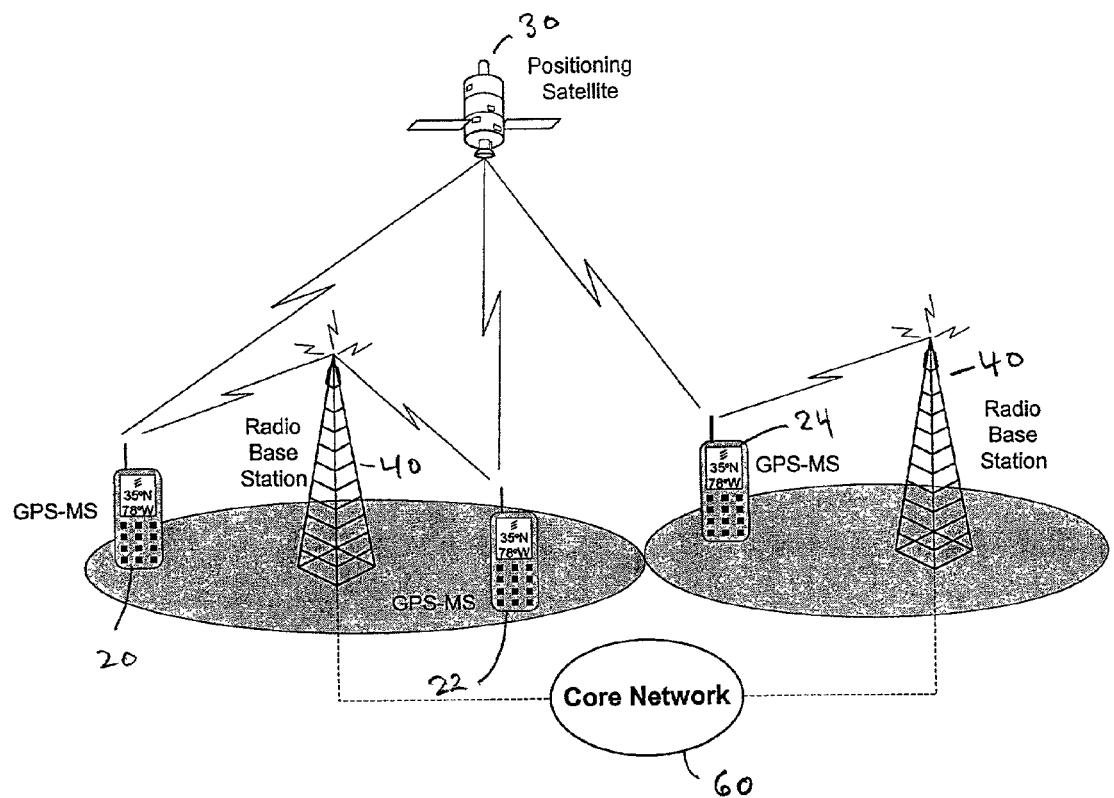

| | | | |
|---|---|---|---|
| 6,671,620 B1* | 12/2003 | Garin et al. | 701/213 |
| 6,748,195 B1* | 6/2004 | Phillips | 455/41.2 |
| 6,816,782 B1* | 11/2004 | Walters et al. | 701/209 |
| 2002/0143856 A1* | 10/2002 | Traversat et al. | 709/202 |

FOREIGN PATENT DOCUMENTS

| | | |
|---|---|---|
| WO | WO 9409599 | 4/1994 |
| WO | WO 9810608 | 3/1998 |
| WO | WO 99/63358 | 12/1999 |
| WO | WO 0010028 | 2/2000 |
| WO | WO 0046777 | 8/2000 |
| WO | WO 0069187 | 11/2000 |
| WO | WO 0158098 | 8/2001 |

OTHER PUBLICATIONS

Patent Abstracts of Japan vol. 2000, No. 14, Mar. 5, 2001 & JP 2000 324120 A (Kokusai Electric Co Ltd), Nov. 24, 2000 abstract.

* cited by examiner

PEER TO PEER INFORMATION EXCHANGE FOR MOBILE COMMUNICATIONS DEVICES

FIELD OF THE INVENTION

This invention is related to cellular telephones and, in particular, to cellular telephones equipped with the capability of determining their location using the Global Positioning Satellite (GPS) system.

BACKGROUND OF THE INVENTION

It is required for cellular telephone operation for a cellular phone to be aware of what cell it is located within. Cells in the cellular telephone system refer to the area covered by singular cellular tower, and can overlap. In general, a cellular phone will monitor the control channel of the cellular tower having the strongest signal. Therefore, a cellular phone has a rudimentary knowledge of its location.

However, there are applications, other than the normal voice communications capabilities of the cellular phone, that may require a more exact knowledge of the phone's location within a cell. These include, for example, an application providing location sensitive advertising over the cell phone, wherein targeted advertising could be sent to cell phone users within a certain proximity of the advertiser's location. Other such applications would be the provision of travel directions based on current location and enhanced 911 emergency services from calls made using a cellular phone.

To improve certain characteristics of GPS receiver performance, such as time-to-first-fix and sensitivity, it is possible to provide to the receiver various aiding information, such as a GPS satellite ephemeris, the approximate time and a reference location. The reference location is an approximation or estimate of the receiver's current position, which, when used with other information, allows the receiver to determine which GPS satellites should be visible and to estimate the signal transit times from the each satellite. Generally, without this aiding information, acquiring the satellite signals and computing the receiver's exact location could take much longer. This delay could have serious impacts on the performance of mobile location-based services, which tend to be time-sensitive.

It is therefore desirable to provide a means by which a reference location and other GPS-related information can be provided to a GPS receiver which is integrated into a cellular phone. It is known in the prior art to provide such information via the cellular network. U.S. Pat. No. 5,365,450 (Schuchman et al.) describes an approach wherein the network transmits GPS satellite ephemeris and other information to a GPS-equipped mobile communication device, which then utilizes this information to acquire the GPS satellite signals and to compute a position estimate. Other methods are described in U.S. Pat. Nos. 5,418,538 (Lau) and 5,883,594 (Lau).

One problem with these approaches is that the GPS-equipped cellular phone may at times be situated within a cell not having access to the GPS-related information. Therefore, it would be desirable to be able to provide this information from another, alternate source. Further, once the capability is established to provide the data from an alternate source, it would be desirable to be able to utilize the alternate source to provide other, application-specific types of data.

SUMMARY OF THE INVENTION

The invention provides a means whereby various GPS-related information, such as the GPS satellite ephemeris and the approximate time, and other, application-specific data, can be provided to a cellular phone via the cellular network, even when the information is unavailable from the cell to which the phone is currently connected. According to this invention, other mobile devices can behave as information servers to mobile devices requiring the information.

The concept of a server in a cellular network is typically constrained to have the server as a fixed node within the cellular infrastructure. As disclosed herein, a cell phone is allowed to be a server in addition to being a client in the cellular network, where it provides information to other mobile units in the network. A primary example of this is a cell phone which is equipped with a GPS receiver that is capable of providing GPS assistance data, such as almanac, ephemeris, reference time, reference location and ionospheric corrections, to other GPS-equipped cell phones in the cellular network and to fixed nodes within the cellular and backbone networks. The key idea here is that the server is not necessarily a fixed node but is a mobile user device.

According to further aspects of the invention, cellular devices connected to the cellular network are able to form hierarchical groups for information-sharing or other purposes. Requests for information may be classified according to various levels of the hierarchy, according to priority, and units may choose to respond or not to respond to requests for information based on the profile and the classification. Further, responses to requests for information may only be accepted from certain member(s) of the group.

Cellular networks currently are set up such that cell phones in the network exchange information and interact mainly with the base station except for user initiated interaction between cell phones, such as a mobile-to-mobile voice calls or SMS messages. This invention further proposes an automatic mode of operation for a cellular network where information is exchanged via cell phone to cell phone interaction in situations that are not indicated by the user of each cell phone in real time.

DETAILED DESCRIPTION OF THE DRAWINGS

FIG. 1 is a schematic diagram of the system of the current invention showing the flow of information and communication channels.

DETAILED DESCRIPTION OF THE INVENTION

FIG. 1 shows a radio network comprised of a core network 60 and a radio access network shown as a plurality of radio base stations 40, each of which serves a region or cell in the network. An example of such a network is a cellular telephone network. The core network consists of the interconnections between the plurality of radio base stations 40 and also may include an interconnection with external networks, such as the PSTN and Internet.

Also shown in FIG. 1 is a plurality of positioning-capable mobile radiotelephones 20 that access the radio network. The following description of the invention uses GPS as an example of an applicable positioning technology. However, this is not intended to limit the invention to GPS receivers. Other positioning technologies such as Russian GLONASS are also relevant. As shown in the figure, the GPS-equipped cellular phone 20 receives signals from the positioning signal sources, in this case GPS satellites 30, and has a bi-directional radio link with one or more of a plurality of radio base stations 40.

The lower layers of the communication protocol between the radio base stations 40 and cellular phones 20 tends to be relatively generic for most air-interface standards, providing a foundation for developing applications that are interesting to the user of the wireless device. Such applications include email, web browsing, etc. Another class of applications that are becoming increasingly important to users is group information services, where multiple members of a group share information about their activities, plans, etc. A wide variety of groups can be imagined, including families, work teams and friends.

One particularly interesting type of group application is requesting and sharing of position information among some or all members of a group. The provision of position information allows group members to locate each other for a variety of reasons, such as, for example, to meet for dinner, sporting activities, shopping, etc. Having GPS capabilities in cell phone 20 allows the user to respond to requests with a highly accurate position information.

However, it is well-known that autonomous GPS does not work in all environments and all situations, due to low signal strength from GPS satellites 30. Thus, there may be many times when the user cannot send his current position because he is unable to receive a sufficient number of GPS signals to compute it. Given the proper aiding information, however, the sensitivity and time-to-first-fix can be improved for a cell phone 20 not having access to the aiding information.

A key aspect of the current invention is that cell phone 20, rather than getting aiding information (assistance) from some central source or server within or outside of core network 60, can request and receive assistance from other cell phones 20 within a group or community.

Consider the example shown in FIG. 1. Three cell phones 20, 22 and 24 are within geographic proximity, either within the same or a nearby cell. Cell phone 24 is in a favorable signal environment (e.g., outdoors) where it is able to acquire a plurality signals from visible GPS satellites 30, demodulate navigation messages (ephemeris, etc.) and store this data in memory. Alternately, cell phone 24 could retrieve aiding information from a source (e.g., a server) within or outside of core network 60. In either case, cell phone 24 has the necessary information to compute its own position, and stores this information for future usage.

Subsequently, a second cell phone 22 in the vicinity of cell phone 24 needs to determine its own location, and also perhaps the location of other cell phones for some group application. Cell phone 22 sends a query to cell phone 24 via radio base stations 40 and core network 60, requesting assistance in determining its own position. Alternatively, cell phone 22 may send out a query to all members of the group rather than to only cell phone 24. Cell phone 24 may respond with one or more of the following according to its internal information:

A list of visible GPS satellites 30 and corresponding ephemeris and clock corrections;
Approximate GPS time-of-week (TOW);
Approximate position (e.g., current or last computed position);
Ionospheric or differential corrections;
Satellite almanac.

This would assist cell phone 22 in acquiring the satellite signals necessary to compute its own position in a timely manner, even in disadvantaged signal conditions.

Cell phone 24 may choose not to provide the aiding information to requesting cell phone 22. Users of cell phones have control over the privacy of both the position and aiding information, either globally or for particular user(s) within the group.

Further, multiple cell phones 20 may exchange position information or aiding information to facilitate or enhance position computation. Such information could include the computed positions of the cell phones or specific pieces of assistance data useful for enhancing GPS receiver performance, such as approximate time, reference location, visible satellites, almanac, ephemeris, ionospheric corrections, etc. Such information could also include the location of nearby base stations 40 that are received by certain cell phones 20 as aiding information and shared with other cell phones 20 that may not have GPS receivers but that may compute their positions using the cellular network with the knowledge of the locations of the base stations 40. This is particularly useful in networks that have synchronized base stations 40, such as cmdaOne.

Alternately, in systems where the locations of base stations 40 are transmitted by the system or are otherwise known, but the timing of their transmissions is unknown, cell phones 20 with GPS receivers can compute the transmission times from different base stations 40 and share this information with cell phones 20 that do not have GPS receivers, so that these cell phones 20 may compute their positions from signals in the terrestrial system. Cell phones 20 with GPS receivers can compute base station transmission times if the base station locations and the location of the cell phone itself is known.

It should be noted that, in general, a cell phone may compile the information that it needs from multiple sources in the group. Hence, the cell phone can put together data about different GPS satellites 30 from multiple group members. The cell phone may need to sort the compiled data based on some criterion such as age of the assistance data. In another aspect of this invention, cell phones may exchange types of data other than GPS position aiding type data. Exchanges of information such as phone numbers and e-mail addresses between phones may take place. Such exchanges may be generated, for example, by a high level requirement by a user for synchronization between the data bases of multiple phones used by the user. Alternately, such applications may be attractive to a group of users who wish to share common information data bases and keep them synchronized and updated. Cell phones within the network may communication using SMS. The cell phones may also communicate through the Wireless Application Protocol (WAP) or Internet Protocol (IP). In essence, any form by which a mobile terminal can send messages to another mobile terminal may be used for exchanging information.

In yet another aspect of the invention, cell phones may form into groups in an ad-hoc manner in order to share specific information. Such groups may be formed with or without user initiation. As an example of the formation of a user-initiated group, all the members of a family may choose to form a group that shares GPS assistance data in order to improve GPS receiver performance. Similarly, a set of friends could from a group to share files for applications such as games or music between their cell phones. In these cases, the cell phone joins a group through direct initiation by the user of the MS.

Alternatively, groups may be formed without user initiation based on profiles set up by the user. As an example, a user may set up a profile within the phone for the class of requests the cell phone may entertain and the services for which the cell phone may join groups. The profile may also indicate that a cell phone should join a group for a certain type of information sharing service, if it can find such a group. After the profile is set up, whenever the cell phone is in contact with another cell phone either for a voice call or for messaging, the cell phones may exchange information regarding the type of information service groups they can be part of and would like to be part of. If the other cell phone is part of or had knowledge of such groups, then the cell phone may join the group. Similarly, the cell phone may allow the other cell phones in the messaging or voice transaction to join a particular group. An example of such an ad-hoc group might be a group that has access to a particular set of games. The user of the cell phone may determine that he would like the cell phone to be a part of a group that can share a particular class of games. The classification of games may be determined by the common application used by all the cell phones in the group.

To facilitate decisions on whether a cell phone may join a particular group and to maintain a list of the members of the group, one cell phone may serve as the group leader or host for the group by storing this information and making sure cell phones that are admitted into the group satisfy all the privacy and any other constraints that might be set up.

In another embodiment of the invention, the formation of groups and the maintenance of a list of cell phones within each group may be performed by a server that is located within the cellular or the backbone data network. For example, the server could be located within the core network and be accessible via IP or WAP. Such a server can be used to allow a cell phone to query the information services available and also to query some or all group members within a certain area. The server may also be used to maintain the status of cell phones within a group with reduced traffic. For example, such a server may maintain the set of cell phones that are able and willing to provide GPS assistance data at the current time.

This invention also contemplates the formation of sub-groups within any group or sub-group and having priorities assigned to the members of each group or sub-group. These priorities may indicate the preferences for requesting information. For example, when a cell phone needs GPS assistance data, it might query members of the sub-group with the highest priority for this function. If it does not obtain information from any of the cell phones in this sub-group, it will then query cell phones belonging to lower priority sub-groups. Sub-groups may be formed independently for each information sharing function. Therefore, there may be a different sets of sub-groups defined for sharing GPS assistance data information and for sharing game application files with no dependence between these two sets of sub-groups.

A protocol may be set up that allows cell phones within the cellular network to query each other about specific information sharing capabilities, such as the capability to gather and distribute GPS assistance data.

Although the traditional fixed client-server relationship relies on the principle that the data from the server is valid, this principle is not necessarily true for the peer-aided case. When the user receives aiding information from some member of a group acting as a server, the user must determine the validity of that information based on the trustworthiness of the source. In the case of GPS assistance, for example, it is possible for a peer server to spoof the requesting cell phone by sending false or inaccurate orbital information for GPS satellites 30, which could lead to erroneous position results in the client cell phone. To address this problem, the client application could assign levels of trust to different groups (e.g., inner circle (family), outer circle (friends and associates), world (everyone else)), and decide from which ones to accept assistance. The client application then matches the available sources with these groups to determine if a source is available that meets the client criteria for trustworthiness, and if not, whether or not to get the information from a secure fixed server instead, or if multiple sources are available, which ones are the most trusted. In one possible embodiment, the user of the cell phone sets the "trust" parameter by a choosing from a menu, with a default trust requirement assumed prior to any choice made.

This invention also contemplates coordinated information sharing between the members of a group for the benefit of all the members of the group: The techniques for this part of the invention, explained in the context of GPS assistance data, are as follows.

Regularly scheduled collection of data: Cell phones in a group that shares data, for example, GPS assistance data, may decide to update their data periodically with the cell phone providing the information to the group being different each time. For example, GPS ephemeris information is valid only for limited time periods of 2–4 hours. In a group having multiple members, the members of the group could take turns downloading the GPS ephemeris information and making it available to other members of the group.

For example, each cell phone in the group may be scheduled to obtain the GPS ephemeris information directly from the GPS satellites (in areas without any network assistance for GPS) once very 8 hours. The scheduled times for members in a four-member group are staggered such that one of the four cell phone is obtaining ephemeris data every 2 hours and distributing this data to peers in the group. Thus, all the cell phones in the group have up to date ephemeris data through cheap messaging operations that require receiver on times of less than a second, except when it is the turn of a cell phone to obtain the ephemeris data directly from satellites, which may take more than 30 seconds or which may not be possible in some environments. This technique enhances the GPS receiver performance of all phones in terms of time to first fix with a significant reduction in the associated penalty of maintain up-to-date ephemeris by reading them off the satellites.

Supply of GPS assistance data by a cell phone within a group to other cell phones in the group to enhance their GPS receiver performance: When cell phones that are part of a group that shares GPS assistance data enter an area where GPS assistance data from the cellular network is unavailable, a cell phone that has poor signal-to-noise ratio for acquiring signals from the GPS satellites may query other cell phones within the group for assistance data. This is a likely scenario for a cell phone that is in an indoor environment and must compute its own position. Any of the cell phones within the group that have good signal-to-noise ratio for the GPS satellite signals may then obtain the assistance data and pass the data on to the cell phone requiring it via the cellular infrastructure. The assistance data will then significantly enhance the sensitivity and time to first fix of the GPS receiver in the cell phone required to position itself.

In another embodiment of the invention, when cell phones are part of a group that shares GPS assistance data in an area where GPS assistance data from the cellular network is available, a cell phone that travels to an area without network assistance can obtain assistance from other cell phones in the group that are within the home area (with network assistance) for GPS assistance data. One of the cell phones within the group will then obtain the assistance data from the network and provide the assistance data to the cell phone that is travelling. In order to account for the difference in visible satellites, the cell phone requesting the assistance data may provide a superset of satellites that is guaranteed to have the visible satellites as a subset. Some forms of assistance, such as reference time (GPS time with respect to a local base station's transmissions), clearly cannot be provided in this embodiment. However, ephemeris and almanac information can be provided.

Supply of data by a cell phone within a group to other cell phones in the group for other reasons such as cost reduction: This technique allows users to share GPS information to avoid service charges. One cell phone could get the information from a network server and then share the information with all others in the group.

In another embodiment of the invention, applications for various information sharing services may be downloaded from a web site on the data network. For example, a GPS assistance sharing application could be downloaded from a portal or a web site. Such an application may be a plug-in for a browser in the cell phone so that gathering of assistance data for the GPS receiver from peer groups may be launched from the browser.

The user of the cell phone may set up a profile that selects from one of several levels of desired standby time and talk time performance. These levels may be indicated as a percentage of the maximum standby and talk time offered by the phone. Such a profile may than be used by the information sharing application to determine to what degree the cell phone will participate in the group sharing activities. For example, a particular standby time limit may cause the cell phone to request GPS assistance information with only certain maximum frequency such as one request every 30 minutes, or on an as-needed basis. The highest priority class among the priority classes discussed earlier may be set up to override such constraints. Constraints may also be set up to protect the privacy of the cell phone. Hence, a cell phone may not provide its position information to members of a group if its privacy constraints are not met by the cell phone to which the information is being sent.

Lastly, cell phones that are currently engaged in a voice call may exchange information, such as GPS assistance data. If a cell phone requires such data and the other cell phone have the data, if privacy conditions and the performance constraints discussed above are met, the data can be transferred during the voice call.

The foregoing invention has been described in terms of usage with a typical cellular telephone network. The invention, however, is not meant to be limited to any single implementation of a cellular network. Various standards for second-generation cellular radio networks, such as GSM, TDMA and cdmaOne, incorporate assistance for GPS-equipped cellular phones. Furthermore, the invention, need not be limited to cellular radio devices and networks. The invention could be implemented using any GPS-equipped mobile communications device, such as a combination computer, GPS & phone device. Therefore, the scope of the invention is embodied in the following claims.

We claim:

1. A mobile terminal comprising:
a GPS receiver to receive GPS data;
a cellular transceiver to communicate with a wireless communications network; and wherein the mobile terminal generates GPS assistance data from the received GPS data, and transmits the GPS assistance data to a remote mobile terminal via the wireless communications network.

2. The mobile terminal of claim 1 wherein the mobile terminal and the remote mobile terminal are part of a group comprising a plurality of mobile terminals communicating via the wireless communications network.

3. The mobile terminal of claim 2 wherein the group is a hierarchical group having one or more levels, and wherein the mobile terminal determines whether to transmit the GPS assistance data to the remote mobile terminal based on the level assigned to the remote mobile terminal.

4. The mobile terminal of claim 2 wherein the group has one or more sub-groups, and wherein the mobile terminal determines whether to transmit the GPS assistance data to the remote mobile terminal based on the sub-group assigned to the remote mobile terminal.

5. The mobile terminal of claim 3 wherein each of the one or more sub-groups is assigned a priority, and wherein the mobile terminal determines whether to transmit the GPS assistance data to the remote mobile terminal based on the priority of the sub-group assigned to the remote mobile terminal.

6. The mobile terminal of claim 2 wherein the mobile terminal determines whether to transmit the GPS assistance data to the remote mobile terminal based on a priority assigned to the remote mobile terminal.

7. The mobile terminal of claim 2 wherein formation of the group is ad-hoc.

8. The mobile terminal of claim 2 wherein formation of the group is based on the geographic proximity of the mobile terminal and the remote mobile terminal.

9. The mobile terminal of claim 2 wherein membership in the group is defined by a profile for each mobile terminal in the group.

10. The mobile terminal of claim 9 wherein the mobile terminal transmits the GPS assistance data to the remote mobile terminal based on the information contained within the profile of the remote mobile terminal.

11. The mobile terminal of claim 10 wherein the mobile terminal is configured to receive the profile of the remote mobile terminal.

12. The mobile terminal of claim 10 wherein the mobile terminal is configured to retrieve the profile of the remote mobile terminal from a server in the wireless communications network.

13. The mobile terminal of claim 1 wherein the mobile terminal is configured to transmit the GPS assistance data responsive to a request from the remote mobile terminal.

14. The mobile terminal of claim 1 wherein the mobile terminal is configured to transmit the GPS assistance data automatically to the remote mobile terminal.

15. A mobile terminal comprising:
a cellular transceiver to communicate with a wireless communications network;
wherein the mobile terminal receives GPS assistance data via the wireless communications network that was generated by a remote mobile terminal from GPS data received by the remote mobile terminal; and
wherein the mobile terminal determines a reference location based on the GPS assistance data received from the remote mobile terminal.

16. The mobile terminal of claim 15 wherein the mobile terminal and the remote mobile terminal are part of a group comprising a plurality of mobile terminals communicating via the wireless communications network.

17. The mobile terminal of claim 16 wherein the group is a hierarchical group having one or more levels, and wherein the mobile terminal determines whether to trust the GPS assistance data received from the remote mobile terminal based on the level assigned to the remote mobile terminal.

18. The mobile terminal of claim 16 wherein the group has one or more sub-groups, and wherein the mobile terminal determines whether to trust the GPS assistance data received from the remote mobile terminal based on the sub-group assigned to the remote mobile terminal.

19. The mobile terminal of claim 18 wherein each of the one or more sub-groups is assigned a priority, and wherein the mobile terminal determines whether to trust the GPS assistance data received from the remote mobile terminal based on the priority of the sub-group assigned to the remote mobile terminal.

20. The mobile terminal of claim 16 wherein the mobile terminal determines whether to trust the GPS assistance data received from the remote mobile terminal based on a priority assigned to the remote mobile terminal.

21. The mobile terminal of claim 15 wherein the mobile terminal is configured to request the GPS assistance data from the remote mobile terminal.

22. The mobile terminal of claim 15 wherein the mobile terminal is configured to receive the GPS assistance data automatically from the remote mobile terminal.

23. A method of exchanging GPS assistance data among mobile terminals communicating within a wireless communications network comprising:
receiving, at a mobile terminal communicating in a wireless communications network, GPS data from an external source;
generating, at the mobile terminal, GPS assistance data from the received GPS data; determining, at the mobile terminal, whether to transmit the GPS assistance data to a remote mobile terminal communicating in the wireless communications network; and
transmitting the GPS assistance data to a remote mobile terminal via the wireless communications network based on the determination.

24. The method of claim 23 further comprising forming a group comprising at least the mobile terminal and the remote terminal.

25. The method of claim 24 wherein the group is a hierarchical group having one or more levels, and wherein the determination of whether to transmit the GPS assistance data to the remote mobile terminal is based on the level assigned to the remote mobile terminal.

26. The method of claim 24 wherein the group includes one or more sub-groups, and wherein the determination of whether to transmit the GPS assistance data to the remote mobile terminal is based on the sub-group assigned to the remote mobile terminal.

27. The method of claim 26 wherein each of the one or more sub-groups is assigned a priority, and wherein the determination of whether to transmit the GPS assistance data to the remote mobile terminal is based on the priority of the sub-group assigned to the remote mobile terminal.

28. The method of claim 24 wherein the determination of whether to transmit the GPS assistance data to the remote mobile terminal is based on a priority assigned to the remote mobile terminal.

29. The method of claim 24 wherein forming a group comprises forming an ad-hoc group.

30. The method of claim 24 wherein forming a group comprises forming the group based on the geographic proximity of the mobile terminal and the remote mobile terminal.

31. The method of claim 23 wherein the determination of whether to transmit the GPS assistance data to the remote mobile terminal is based on information contained within a profile set up by the user of the remote mobile terminal.

32. The method of claim 31 further comprising receiving, at the mobile terminal, the profile of the remote mobile terminal.

33. The method of claim 31 further comprising retrieving the profile of the remote mobile terminal from a server in the wireless communications network.

34. The method of claim 23 further comprising the mobile terminal transmitting the GPS assistance data to the remote mobile terminal responsive to a request from the remote mobile terminal.

35. The method of claim 23 further comprising the mobile terminal transmitting the GPS assistance data automatically to the remote mobile terminal.

36. The method of claim 24 further comprising assigning the mobile terminal to periodically retrieve the GPS data and transmit the generated GPS assistance data to the remote mobile terminal.

37. A method of exchanging GPS assistance data among mobile terminals communicating within a wireless communications network comprising:
receiving, at a mobile terminal, GPS assistance data from a remote mobile terminal over a wireless communications network, the GPS assistance data being generated by the remote mobile terminal from GPS data received by the remote mobile terminal;
determining whether to trust the GPS assistance data received from the remote mobile terminal as valid; and
determining a reference location based on the GPS assistance data received from the remote mobile terminal.

38. The method of claim 37 wherein the mobile terminal and the remote mobile terminal are part of a group comprising a plurality of mobile terminals communicating via the wireless communications network.

39. The method of claim 38 wherein the group is a hierarchical group having one or more levels, and wherein the determination of whether to trust the GPS assistance data received from the remote mobile terminal is based on the level assigned to the remote mobile terminal.

40. The method of claim 38 wherein the group has one or more sub-groups, and wherein the determination of whether to trust the GPS assistance data received from the remote mobile terminal is based on the sub-group assigned to the remote mobile terminal.

41. The method of claim 38 wherein each of the one or more sub-groups is assigned a priority, and wherein the determination of whether to trust the GPS assistance data received from the remote mobile terminal based on the priority of the sub-group assigned to the remote mobile terminal.

42. The method of claim 38 further comprising assigning a priority to the remote mobile terminal, and wherein the determination of whether to trust the GPS assistance data received from the remote mobile terminal is based on the assigned priority.

43. The method of claim 37 further comprising requesting the remote mobile terminal to transmit the GPS assistance data.

44. The method of claim 37 further comprising receiving the GPS assistance data periodically from the remote mobile terminal.

* * * * *